(12) United States Patent
Anger et al.

(10) Patent No.: US 7,078,634 B2
(45) Date of Patent: Jul. 18, 2006

(54) MOUNTING STRUCTURE FOR AN ELECTRIC SWITCH

(75) Inventors: Nils Anger, Berlin (DE); Matthias Biener, Neuenhagen (DE); Stefan Rautmann, Berlin (DE); Andreas Stelzer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 257 days.

(21) Appl. No.: 10/493,645

(22) PCT Filed: Oct. 4, 2002

(86) PCT No.: PCT/DE02/03848

§ 371 (c)(1),
(2), (4) Date: Apr. 22, 2004

(87) PCT Pub. No.: WO03/038965

PCT Pub. Date: May 8, 2003

(65) Prior Publication Data

US 2004/0246664 A1    Dec. 9, 2004

(30) Foreign Application Priority Data

Oct. 22, 2001    (DE) ............................... 101 53 109

(51) Int. Cl.
*H01H 9/22* (2006.01)
*H01H 9/24* (2006.01)

(52) U.S. Cl. ............................. 200/50.21; 200/50.22; 200/50.24; 200/50.26

(58) Field of Classification Search .. 200/50.21–50.27; 361/605–610, 615–617
See application file for complete search history.

(56) References Cited

U.S. PATENT DOCUMENTS

| 3,610,850 | A | * | 10/1971 | Eichelberger | ............ 200/50.21 |
| 4,565,908 | A | * | 1/1986 | Bould | ...................... 200/50.22 |
| 4,713,501 | A | | 12/1987 | Herrmann | |
| 4,773,870 | A | * | 9/1988 | Sinnig | ...................... 200/50.27 |
| 5,337,210 | A | * | 8/1994 | Ishikawa et al. | ............ 361/608 |
| 5,486,978 | A | * | 1/1996 | Fishovitz | ..................... 361/617 |
| 5,837,949 | A | * | 11/1998 | Green et al. | ............. 200/50.21 |
| 6,265,678 | B1 | * | 7/2001 | Robbins et al. | ........... 200/50.21 |
| 6,563,062 | B1 | * | 5/2003 | Kurano et al. | ........... 200/50.24 |
| 6,864,444 | B1 | * | 3/2005 | Anger et al. | ............. 200/50.21 |

FOREIGN PATENT DOCUMENTS

GB    2 013 980 A    8/1979

OTHER PUBLICATIONS

Handbook, ABB Calor Emag Taschenbuch Schaltanlagen, No. 10, Cornelsen Verlag Berlin, Chapter, 8.2.4 Metallgekapselte luftisolierte Schaltfelder nach DIN EN 60298 (VDE 0670, Teil 6), p. 392.

* cited by examiner

*Primary Examiner*—Michael A. Friedhofer
(74) *Attorney, Agent, or Firm*—Morrison & Foerster LLP (57) ABSTRACT

The aim of the invention is to achieve, in the simplest possible manner, a movement of an electric switch (3) of a medium-high voltage switch panel on a mounting structure (1) between an interrupt position, a test position and an operating position. To this end, a single mechanical control module (9) is integrated in the mounting structure (1). This control module (9) controls the individual movement sequences while simultaneously transferring the drive forces required therefor.

10 Claims, 6 Drawing Sheets

MOUNTING STRUCTURE FOR AN ELECTRIC SWITCH

CLAIM FOR PRIORITY

This application claims priority to International Application No. PCT/DE02/03848, which was published in the German language on May 8, 2003, which claims the benefit of priority to German Application No. 101 53 109.5, which was filed in the German language on Oct. 22, 2001.

TECHNICAL FIELD OF THE INVENTION

The invention relates to a mounting structure for an electric switch of an enclosed switch panel, in particular a medium-voltage switch panel, which switch can be made to move between an operating position, a test position and an interrupt position.

BACKGROUND OF THE INVENTION

Such a mounting structure is known for example from the chapter "8.2.4 Metallgekapselte luftisolierte Schaltfelder nach DIN EN 60298 (VDE 0670, Teil 6)" [Metal-enclosed air-insulated switch panels to DIN EN 60298 (VDE 0670, Part 6)] of "ABB-Taschenbuch Schaltanlagen" [ABB pocketbook on switchgear], 10th edition, Cornelsen Verlag Berlin, page 392. Shown there is a metal-clad switch panel which is subdivided into a number of compartments, such as for example a busbar compartment, a cable terminal compartment and a switch compartment. Arranged in the switch compartment is an electric switch. This electric switch can be made to move between an operating position, a test position and an interrupt position. In the interrupt position, the connecting pieces of the electric switch are electrically separated from corresponding counter-contact pieces and the secondary lines are interrupted by means of a plug-in connection. In the test position, the connecting pieces of the switch are separated from the counter-contact pieces. In this position, the secondary lines of the switch and switch panel are connected to one another via the plug-in connection. In the operating position, the connecting pieces of the switch contact the counter-contact pieces.

By means of the plug-in connection, the secondary lines are connected to one another. The connecting pieces of the electric switch are in this case arranged in such a way that, in the operating position, they protrude through openings provided in a bulkhead into the busbar compartment or the cable terminal compartment. These openings can be closed by means of shutters, in order to ensure a bulkhead effect of the bulkhead even in the case of an electric switch that has been removed or is in the interrupt or test position. The moving of the electric switch on the mounting structure between the operating position, the test position and the interrupt position is performed by complex mechanical devices.

SUMMARY OF THE INVENTION

The invention relates to a mounting structure for an electric switch of an enclosed switch panel, in particular a medium-voltage switch panel, which switch can be made to move between an operating position, a test position and an interrupt position, a plug-in connection being provided for the connection of secondary lines and openings which can be closed by means of shutters being provided in a bulkhead for leading through connecting pieces of the electric switch.

The invention discloses a mounting structure such that the moving of the electric switch is made possible by a simplified, reliable and low-cost construction.

According to one embodiment of the invention, there is a single mechanical control module which is integrated in the mounting structure and controls the actuation of the plug-in connection and of the shutters and the moving of the electric switch between the interrupt position, the test position and the operating position.

The integration of a single control module in the mounting structure makes it possible to restrict the number of components necessary for realizing the movement operation and to restrict the necessary adjustment to a very small amount. Furthermore, the mounting structure with the electric switch arranged on it can be easily removed, for example for maintenance purposes, in its entirety from the switch panel. It is consequently possible to dispense with mechanical couplings between the fixed switch panel and the movable mounting structure. The mounting structure represents a cartridge-like slide-in unit, which can be exchanged without any problem for another mounting structure (if appropriate with an electric switch arranged on it). The control operations concerning the movement of the electric switch on the mounting structure are instigated by the mechanical control module itself. Auxiliary devices, such as additional gear mechanisms, deflecting devices, blocking levers, etc. are no longer necessary in the case of such a construction. On account of the integration in the mounting structure, very simple mechanical constructions can be chosen. Complex lever arrangements for the transfer of forces are avoided.

Furthermore, it may be advantageously provided that the control module has a continuous first slotted link and a bolt which is guided in it and, during its movement, successively engages with and disengages from various driving devices.

The use of a continuous first slotted link and a bolt guided in it represents a mechanically extremely robust arrangement. In addition, such slotted links or bolts can be produced in an extremely simple manner. By appropriate shaping of the slotted link, it is easily possible to make various driving devices engage with and disengage from the bolt.

In addition, it may also be advantageously provided that the driving devices are formed as plates and are guided by means of guiding bolts in elongate holes on the outer sides of the control module.

If the driving devices are formed as plates, a very low overall height is obtained for these devices. In spite of the low overall height, such driving devices in plate form can transfer very high forces. The guiding of the driving devices on the outer sides of the control module provides the possibility of arranging a multiplicity of such driving devices such that they do not adversely affect one another in the way in which they operate. It is consequently possible to guide the driving devices in a simple way by means of bolts in elongate holes. Furthermore, it is possible to fasten to the driving devices arms for the transfer of movements.

A further advantageous embodiment provides that the bolt both controls the moving of the electric switch and transfers drive forces for making the electric switch move.

If the bolt is used both for controlling the moving of the electric switch and for transferring the drive forces necessary for this, it is possible to dispense with additional force transfer elements or control elements. This in turn allows the mechanical structure of the control module to be greatly simplified. In this way, a separation of the control arrangement and drive arrangement, increasing the overall volume, is avoided.

In addition, it may be advantageously provided that the bolt can be moved by means of a pivotable drive lever essentially parallel to a follower which can be driven on a drive spindle and is connected to the drive lever.

If the bolt can be moved essentially parallel to a drive spindle, the necessary movement of the movable electric switch between the operating position, the test position and the interrupt position can as a result be achieved in a favorable way. The transfer of the drive force from the drive spindle to the bolt can in this case take place in a suitable way by means of a drive lever. This construction is very robust and suitable for transferring high driving forces. The use of a drive spindle allows a reaction force acting from the switch via the bolt and the drive lever to be automatically inhibited on account of its self-locking effect.

It may be advantageously provided that spring-loaded pawls which are guided and can be latched in further slotted links are connected to the various driving devices.

If further slotted links in which spring-loaded pawls are guided are provided, it is possible to allow the release of the various driving devices in a simple way. If the driving devices are unlatched, it is possible to move the driving devices by the bolt. It is therefore provided that, in their end positions, the driving devices are respectively latched with the pawls in the further slotted links, and so an undesired movement or change in position of the driving devices is ruled out.

Furthermore, it may be advantageously provided that the pawls can be actuated by the bolt itself.

If the bolt is provided as the actuating device for the pawls, it is possible in an extremely simple way to move the driving devices when the bolt is located in the regions intended for this purpose.

Furthermore, it may be provided that a common slotted-link plate has the first slotted link for guiding the bolt and the further slotted links.

If the first slotted link and the further slotted links are arranged in a common slotted-link plate, a change in position of the individual slotted links in relation to one another is no longer possible once this slotted-link plate has been produced. It is consequently ensured that the control of the movement sequence is ensured in a reliable way even after a large number of movement operations. Furthermore, complex adjustment work during assembly is avoided.

A further advantageous design provides that the drive lever assigned to the bolt is guided between two slotted-link plates arranged at a distance from each other and each of the slotted-link plates respectively has the continuous first slotted link, the bolt being guided in both slotted links.

If the bolt is guided in two slotted-link plates which are arranged at a distance from each other and respectively have the first slotted link, the transfer of very high drive forces is made possible as a result in a very simple way, since canting of the bolt in a single slotted link is ruled out. The transfer of high drive forces is further supported by the guidance of the drive lever between the two slotted-link plates. At the same time, the bolt is guided by such an arrangement in an automatically securing manner between the slotted-link plates if a fixed connection is provided between the drive lever and the bolt. Additional securing devices such as splints or securing plates are then not required.

Furthermore, it may be advantageously provided that one of the driving devices is connected to a movable arm for the actuation of the plug-in connection, on which arm a plug-in connector part is mounted in a floating manner.

If one of the driving devices is assigned a movable arm, the latter can be used in a simple way for moving part of the plug-in connection. Depending on the movement of the driving device, it is then possible to connect a plug-in connector part of the plug-in connection to a corresponding counter piece. The floating mounting of the plug-in connector part makes it possible to compensate for tolerances with regard to the mechanical arrangement of the plug-in connector part and the associated counter piece of the plug-in connection and to relieve the plug-in connection itself of external forces.

BRIEF DESCRIPTION OF THE DRAWINGS

An exemplary embodiment of the invention is to be described in more detail below and shown on the basis of a drawing, in which.

DETAILED DESCRIPTION OF THE INVENTION

Figure 1:
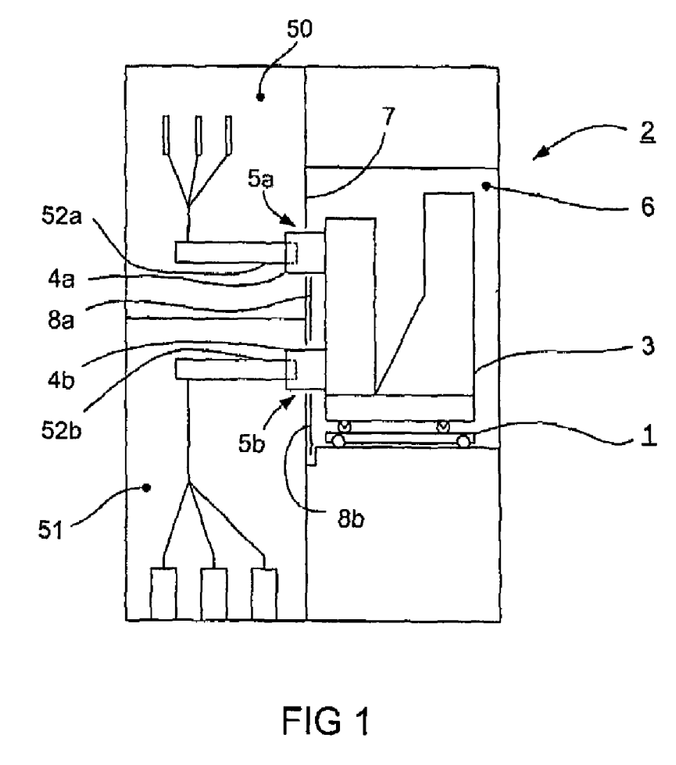
FIG. 1 shows a section through a schematically represented switch panel.

The mounting structure 1, and the components assigned to it, can be made to move into and out of a switch compartment 6 of an enclosed switch panel 2 (FIG. 1). This moving in and out is used essentially for maintenance purposes or for the exchange of a defective mounting structure 1 or subassemblies arranged on the mounting structure 1. An electric switch 3 can be made to move in relation to the mounting structure 1 between an operating position, a test position and an interrupt position. The connecting pieces 4*a,b* of the electric switch 3 can be led through openings 5*a,b* in a bulkhead 7 of the switch panel 2. These openings 5*a,b* are closed in the test position and in the interrupt position of the electric switch 3 by shutters 8*a,b*. On one side, the bulkhead 7 is adjacent to the switch compartment 6. On the other side of the bulkhead 7 there is a busbar compartment 50 and a cable terminal compartment 51. In the cable terminal compartment 51 and the busbar compartment 50 there are respectively counter-contact pieces 52*a,b*.

With the counter-contact pieces 52*a,b*, the connecting contact pieces 4*a,b* can be contacted by making the electric switch 3 move.

Figure 2:
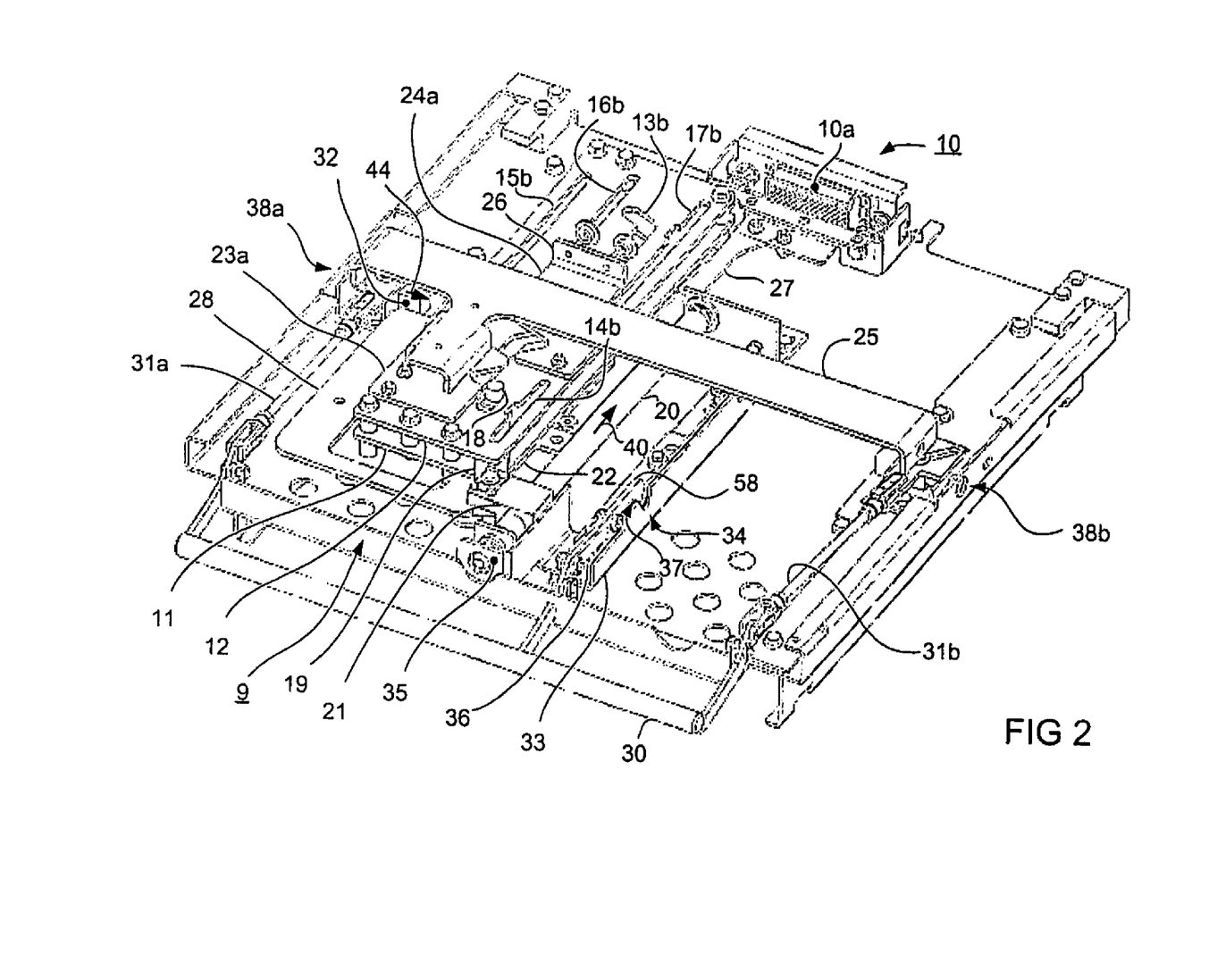
FIG. 2 shows a schematic perspective view of the mounting structure with an integrated mechanical control module.

FIG. 2 shows a perspective view of the mounting structure 1, without the electric switch 3 assigned to the mounting structure 1 being represented.

To be described first is the mechanical control module 9, which is provided for making the electric switch 3 move between the operating position, the test position and the interrupt position, for actuating the shutters 8*a,b*, and the actuation of a plug-in connection 10 for the connection of secondary lines. Secondary lines are, for example, measuring lines, control lines or communication lines.

Figure 3:
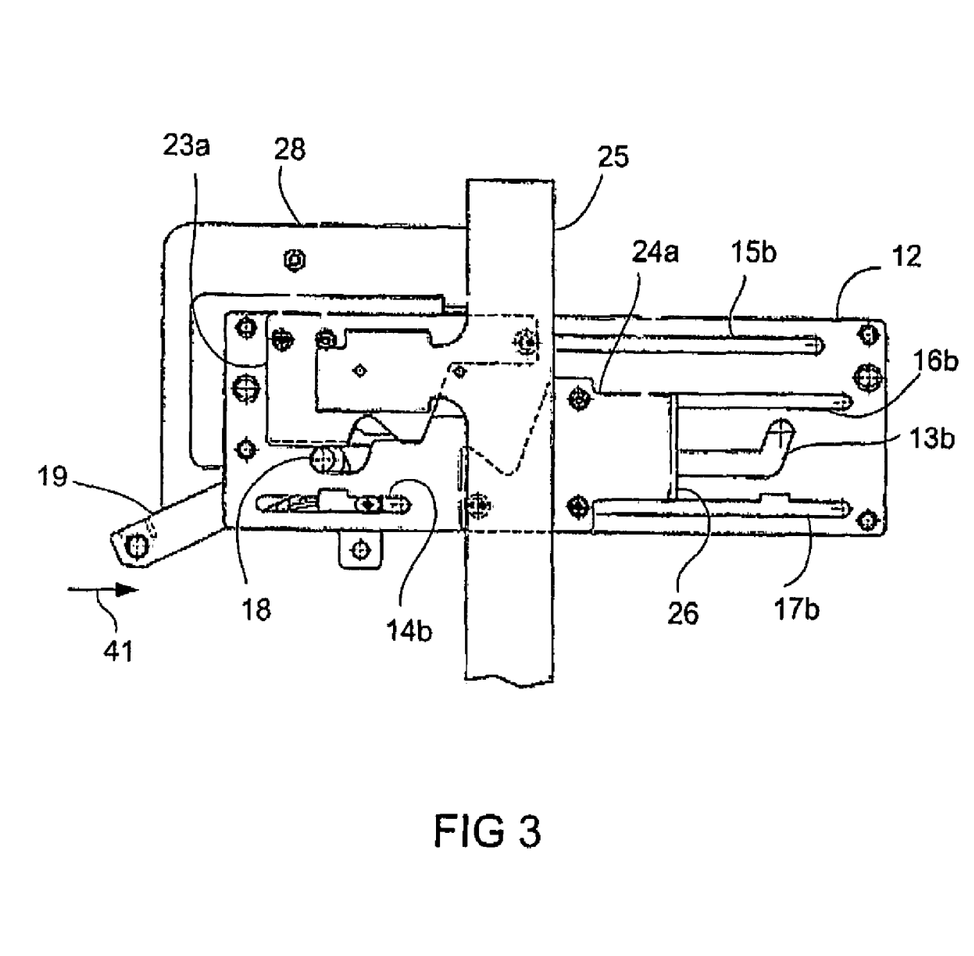
FIG. 3 shows a plan view of the first side of the control model, facing the switch.
Figure 4:
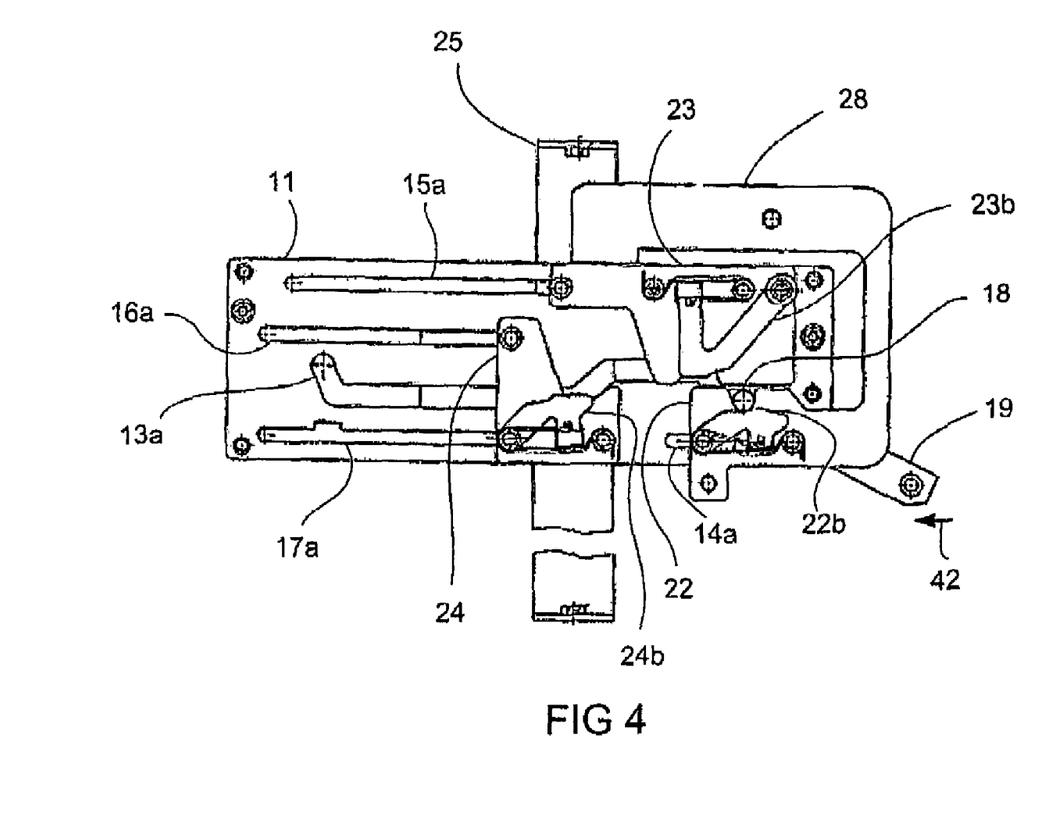
FIG. 4 shows a plan view of the second side of the control model, facing away from the switch.
Figure 5:
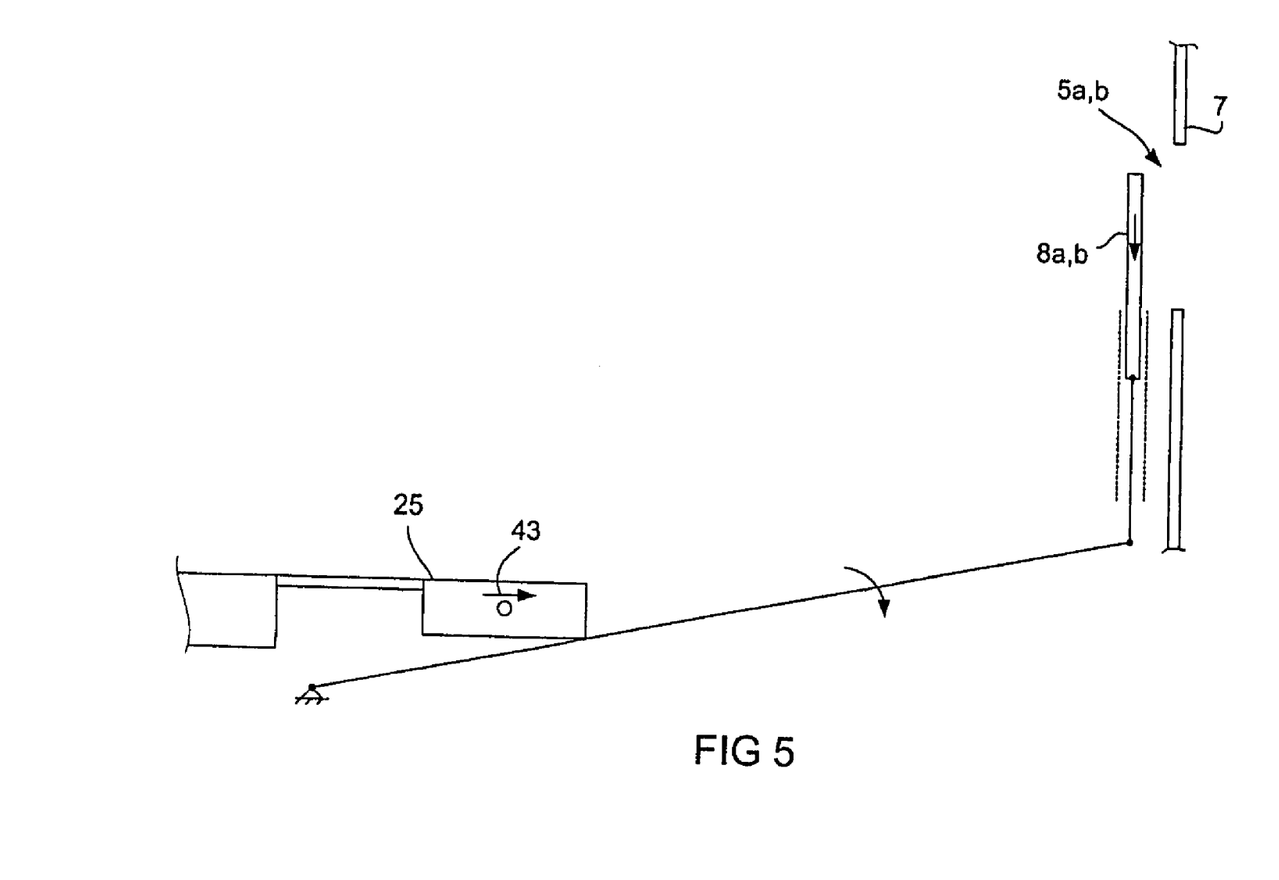
FIG. 5 shows a schematic representation of a lever chain for the actuation of the shutters.

The mechanical control module 9 has a rectangular first slotted-link plate 11 and an identically formed rectangular second slotted-link plate 12 (FIGS. 3, 4). The first slotted-link plate 11 and the second slotted-link plate 12 are arranged at a distance from each other. Each of the slotted-link plates 11, 12 has an identical continuous first slotted link 13a,b and a first, a second, a third and a fourth further slotted link 14a,b, 15a,b, 16a,b, 17a,b. In the first slotted links 13a,b, a bolt 18 is guided. The drive of the bolt 18 takes place by means of a drive lever 19, which is arranged between the two slotted-link plates 11, 12. The drive lever 19 is in turn connected to a follower 21 arranged on a rotatably mounted drive spindle 20 (FIG. 2). The drive spindle 20 can be made to rotate by means of a tool. Depending on the direction of rotation of the drive spindle 20, a movement of the bolt 18 takes place in a first direction or a second direction, opposite to the first direction. Arranged on the side of the mechanical control module 9 facing away from the electric switch 3 is a first driving device 22 (FIG. 4). The first driving device 22 is movably guided by means of guiding bolts in the first further slotted link 14a of the first slotted-link plate 11. A second driving device 23 is movably mounted in the second further slotted links 15a,b of the first and second slotted-link plates 11, 12, likewise by means of guiding bolts. In the third and fourth further slotted links 16a,b, 17a,b of the first and second slotted-link plates 11, 12, a third driving device 24 is movably mounted by means of guiding bolts. To achieve a symmetrical distribution of the drive forces, the second driving device 23 has a second part 23a, which is rigidly connected by means of the guiding bolts and arranged on the side of the mechanical control module 9 facing the switch (FIG. 3). Furthermore, the third driving device 24 has a second part 24a, which is rigidly connected by means of guiding bolts and arranged on the side of the mechanical control module 9 facing the switch. Arranged at a fixed angle on the second part 23a of the second driving device 23 is an essentially T-shaped bar 25, which effects the movement of the shutters 8a,8b (FIG. 2, cf. FIG. 5). Formed onto the second part 24a of the third driving device 24 is a fastening strap 26, which has bores and to which the electric switch 3 is fastened and can be made to move with it in relation to the mounting structure 1 between the operating position, the test position and the interrupt position (FIGS. 2, 3). Arranged on the first driving device 22 is a movable arm 27, which moves a plug-in connector part 10a. Furthermore, the first driving device 22 has a blocking arm 28, the function of which is to be described further below. To secure the three driving devices 22, 23, 24 in the respective end positions and prevent unwanted movement, each of the driving devices is assigned a pawl 22b, 23b, 24b (FIG. 4). On account of the use of a self-locking drive spindle 20 and the construction of the first driving device 22, there is no need for locking of the first driving device 22 in the interrupt position of the switch 3. Although the pawls 22b, 23b, 24b are not formed entirely identically in their construction, they are each the same in the way in which they operate. Each of the pawls 22b, 23b, 24b is formed as a lever which can pivot about a guiding bolt. These levers respectively have at their free ends a right-angled bend 22c, 23c, 24c extending into the first slotted-link plate 11 (FIG. 6), which bends respectively protrude into one of the further slotted links 14b, 15b, 17b. The pawls 22b, 23b, 24b are respectively spring-loaded and, in the non-actuated state, press the bends 22c, 23c, 24c respectively against an edge of the further slotted links 14b, 15b, 17b. Formed in specific regions in the edges of the further slotted links 14b, 15b, 17b are recesses 53, 54, 55, 56, 57, in which the bends 22c, 23c, 24c are able to latch under the spring loading for fixing the respective driving device.

The operation of making the electric switch 3 move from the interrupt position via the test position into the operating position is to be described below.

Figure 6:
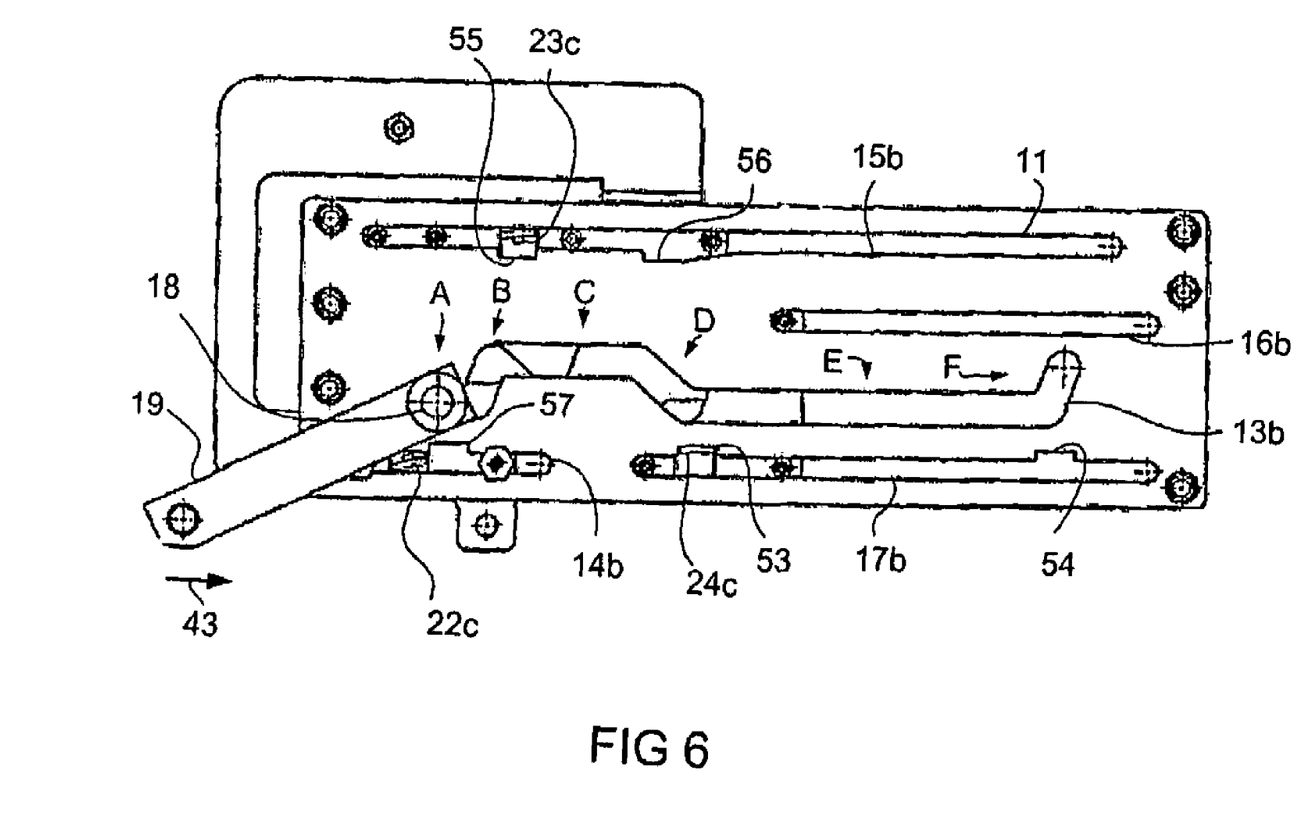
FIG. 6 shows a view of a slotted-link plate.

At first, the electric switch 3 is in the interrupt position. In this position, the connecting pieces 4a,b are separated from the counter-contact pieces 52a,b. The plug-in connection 10 for the connection of the secondary lines is separated. The openings 5a,b in the bulkhead 7 are closed by shutters 8a,b. The bolt 18 is in the position represented in FIGS. 3, 4 and 6 (region A, FIG. 6). If the drive spindle 20 is then made to rotate in a first direction, the follower 21 on the drive spindle 20 begins to move in the direction which is designated by the arrows 40, 41, 42, 43 in FIGS. 2, 3, 4, 6, and thereby moves the bolt 18 via the drive lever 19 along the continuous first slotted link 13a,b (FIG. 2, FIG. 6). At first, the bolt 18 is in engagement with the first driving device 22 and likewise moves the first driving device 22. Via the movable arm 27, the floating plug-in connector part 10a is thereby moved in the direction of the arrow 40 (FIG. 2) and enters the counter piece (not represented) that is arranged in a corresponding manner. Until the region B of the continuous first slotted link 13a,b is reached, the bolt 18 is constantly in engagement with the first driving device 22. When the region B is reached, the bolt 18 disengages from the first driving device 22 and allows the first pawl 22b to latch into the recess 57 of the first further slotted link 14b, so that the first driving device 22 is fixed in its position. The electric switch 3 is then in the test position. That is, the contact of the secondary lines is established via the plug-in connection 10, the electric switch 3 itself is still in the interrupt position, i.e. the connecting pieces 4a,b of the electric switch 3 are separated from the counter-contact pieces 52a,b, and the shutters 8a,b are still closed in front of the openings 5a,b in the bulkhead 7. If the bolt 18 is kept moving by means of the drive spindle 20, it unlatches the second pawl 23b of the second driving device 23 and moves the second driving device 23 through the region C of the first slotted link 13a,b. Via the T-shaped bar 25 (FIG. 2), which is arranged on the part 23a of the second driving device 23, the shutters 8a,b are then moved in front of the openings 5a,b in the bulkhead 7 and release the opening 5a,b. This takes place for example via a mechanical lever chain schematically represented in FIG. 5. Toward the end of the portion C, the bolt 18 disengages from the second driving device 23 and latches the second pawl 23b in the recess 56 of the second further slotted link 15b, so that the second driving device 23 is also secured in its momentary position. In the region D, the bolt actuates the third pawl 24b, which is assigned to the third driving device 24 and unlatches the latter. Subsequently, the electric switch 3, screwed to the formed-on fastening strap 26, is made to move by means of the third driving device 24, 24a along the region E in relation to the mounting structure 1 into the operating position. That is, the connecting pieces 4a,b of the electric switch 3 are moved through the now free openings 5a,b in the bulkhead 7 and come into electrical contact with the counter-contact pieces 52a,b on the other side of the bulkhead 7. Toward the end of the movement of the electric switch 3, in the region F of the continuous first slotted link, the third pawl 24b latches in the recess 54, so that this position of the third driving device 24 is also secured. After that, the bolt 18 is moved into a rest position, to ensure secure latching of the third pawl 24b. In addition to the latching by the third pawl 24b, unintentional movement of the electric switch 3 in the operating position is prevented on account of the design of the third driving device 24 in interaction with the self-locking drive spindle 20. The electric switch 3 has then reached its operating position. To make the electric switch 3 move from its operating position into the interrupt position, the drive spindle 20 is then moved in the opposite direction of rotation, and the sequence of the individual movement phases takes place in the reverse order.

Since the moving of the electric switch 3 from the interrupt position via the test position into the operating position and vice versa takes place under certain boundary conditions, several locking conditions also have to be satisfied.

One of the main locking conditions is realized in dependence on the position of a handle bar 30 pivotably arranged on the front side of the mounting structure 1 (FIG. 2). In the state in which the mounting structure 1 has been pushed into the switch compartment 6 of the switch panel 2, the handle bar 30 is arranged such that it is pivoted away. If it is then intended to pull the mounting structure 1, and the electric switch 3 arranged on the mounting structure 1, out of the switch compartment 6, the handle bar 30 is pivoted upward. This pivoting up is only possible, however, if a blocking piece 32, which can be displaced via a transmission rod 31*a* by means of a slotted-link control, is displaceable from its rest position in the direction of the arrow 44. This is so because this blocking piece 32 is blocked by the already mentioned blocking arm 28, which is assigned to the first driving device 22, as soon as the interrupt position has been left. It is ensured by this locking that on the one hand the handle bar 30 can only be pivoted up when the electric switch 3 is in the interrupt position. On the other hand, the electric switch 3 is made to move out of its interrupt position into the test position and further into the operating position if the handle bar 30 has been pivoted away into its rest position, since otherwise the movement of the blocking arm 28 is prevented by the blocking piece 32.

A further locking condition is realized by a pushing element 58 having a ramp. This pushing element 58 is displaceable in dependence on the position of the handle bar 30 parallel to an angle profile 33. The angle profile 33, which has a recess 34 with a ramp in one of the profile legs, is fixed in place on the base area of the mounting structure 1. A control rod (not represented) protrudes into this recess 34. This control rod, which is not represented and extends perpendicularly in relation to the base area of the mounting structure 1, is undisplaceable or displaceable in its position in dependence on the switching position of the electric switch 3. In the switched-on state, the control rod protrudes undisplaceably into the recess 34, so that the pushing element 57 cannot push the control rod up and away by means of the ramp against the running slope of the recess 34. The handle bar 30 consequently cannot be pivoted up from its rest position into the operating position. If the electric switch 3 is switched off can the handle bar 30 be pivoted up from its rest position into the operating position. Then the control rod is movable in such a way that it is displaceable by a movement of the handle bar 30 and can be pushed upward by means of the ramp of the pushing element 58.

Apart from the locking conditions already described, a further locking condition is provided. The drive spindle 20 has on its front side an appropriate shaping, so that a tool can be placed onto the drive spindle 20 to set it in rotation. Arranged in front of the end face there of the drive spindle 20 is a perforated plate 35. This perforated plate 35 is displaceable in the direction of the axis of rotation of the drive spindle 20. This displacement is effected by the operating tool being applied. This perforated plate 35 is connected to a displaceable further angle profile 36, which is guided parallel to the angle profile 33 described above. The further angle profile 36 has a further recess 37. The further recess 37 can also be blocked by the control rod described above, in the same way. That is, the perforated plate 35 is displaceable by means of the tool to be fitted on if the control rod protrudes displaceably into the further recess 37. The fitting on of the operating tool, and consequently the moving of the electric switch 3 between the operating position, the test position and the interrupt position, takes place if the electric switch 3 is in a switched-off state.

Furthermore, a locking of the mounting structure 1 in the switch compartment 6 of the switch panel 2 is provided in dependence on the pivoting position of the handle bar 30. With the pivoting up of the handle bar 30 into the operating position, latching bolts 38*a,b* are withdrawn by means of transmission rods 31*a,b*. The withdrawal takes place by means of identical slotted-link controls. Once the locking conditions, inquired in parallel, are satisfied can the mounting structure 1, with the subassemblies arranged on the mounting structure 1, then be withdrawn and removed from the switch compartment 6 of the switch panel 2. If the control rod has been displaced upward out of the recess of the angle profile 33 on account of the pivoting movement of the handle bar 30 or the fitting of the tool onto the drive spindle 20, it is ensured by a mechanism not described in any more detail here that the switching-on operation of the electric switch 3 is prevented.

| List of designations | |
|---|---|
| 1 | mounting structure |
| 2 | switch panel |
| 3 | switch |
| 4a,b | connecting pieces |
| 5a,b | openings |
| 6 | switch compartment |
| 7 | bulkhead |
| 8a,b | shutters |
| 8 | control module |
| 8a,b | shutters |
| 9 | control module |
| 10 | plug-in connection |
| 10a | plug-in connector part |
| 11 | slotted-link plate |
| 12 | slotted-link plate |
| 13a,b | slotted link |
| 14a,b | slotted link |
| 15a,b | slotted link |
| 16a,b | slotted link |
| 17a,b | slotted link |
| 18 | bolt |
| 19 | drive lever |
| 20 | drive spindle |
| 21 | follower |
| 22 | driving device |
| 22b | pawl |
| 22c | bend |
| 23 | driving device |
| 23a | part |
| 23b | pawl |
| 23c | bend |
| 24 | driving device |
| 24a | part |
| 24b | pawl |
| 24c | bend |
| 25 | T-bar |
| 26 | fastening strap |
| 27 | arm |
| 28 | blocking arm |
| 30 | handle bar |
| 31a,b | transmission rod |
| 32 | blocking piece |
| 33 | angle profile |
| 34 | recess |
| 35 | perforated plate |
| 36 | angle profile |
| 37 | recess |

-continued

List of designations

| | |
|---|---|
| 38a,b | latching bolt |
| 40,41 | arrows |
| 42,43,44 | arrows |
| 50 | busbar compartment |
| 51 | cable terminal compartment |
| 52a,b | counter-contact pieces |
| 53,54,55 | recesses |
| 56,57 | recesses |
| 57 | pushing element |

What is claimed is:

1. A mounting structure for an electric switch of an enclosed switch panel the switch is configured to move between first position, a second position and third position, a plug-in connection being provided for connection of secondary lines and openings which are configured to be closed by shutters being provided in a bulkhead for leading through connecting pieces of the electric switch wherein a single mechanical control module which is integrated in the mounting structure and controls actuation of the plug-in connection and of the shutters and the moving of the electric switch between the third position, the second position and the first position.

2. The mounting structure as claimed in claim 1, wherein the control module has a continuous first slotted link and a bolt which is guided therein and, during movement, successively engages with and disengages from various driving devices.

3. The mounting structure as claimed in claim 2, wherein the driving devices are formed as plates and are guided by guiding bolts in elongate holes on outer sides of the control module.

4. The mounting structure as claimed in claim 2, wherein the bolt controls the moving of the electric switch and transfers drive forces for making the electric switch move.

5. The mounting structure as claimed in claim 2, wherein the bolt is configured to be moved by a pivotable drive lever essentially parallel to a follower which can be driven on a drive spindle and is connected to the drive lever.

6. The mounting structure as claimed in claim 5, wherein the drive lever assigned to the bolt is guided between two slotted-link plates arranged at a distance from each other and each of the slotted-link plates respectively has the continuous first slotted link, the bolt being guided in both slotted links.

7. The mounting structure as claimed in claim 2, wherein spring-loaded pawls which are guided and configured to be latched in additional slotted links are connected to the various driving devices.

8. The mounting structure as claimed in claim 7, wherein the pawls are configured to be actuated by the bolt.

9. The mounting structure as claimed in claim 7, wherein a common slotted-link plate has the first slotted link for guiding the bolt and the additional slotted links.

10. The mounting structure as claimed in claim 2, wherein one of the various driving devices is connected to a movable arm for actuation of the plug-in connection, on which arm a plug-in connector part is mounted in a floating manner.

* * * * *